June 11, 1946.      A. A. KAHIL      2,401,828
FABRIC
Filed July 18, 1944
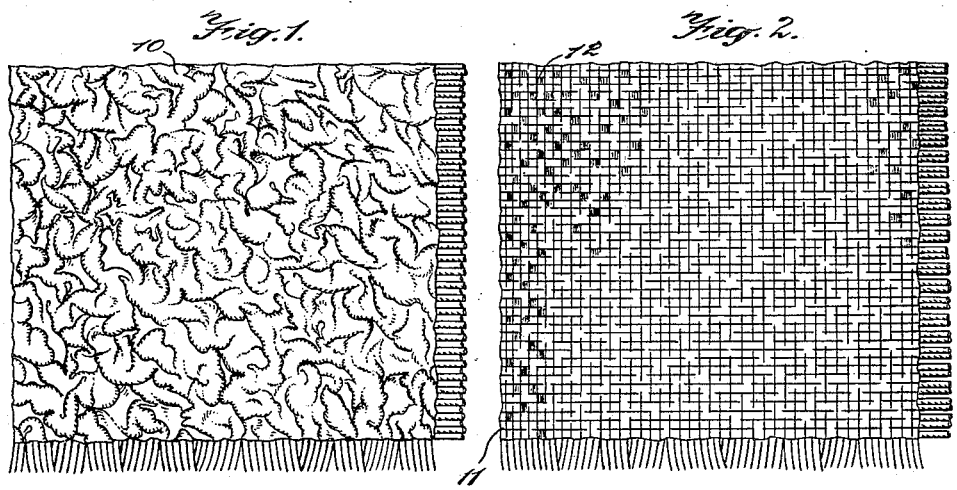
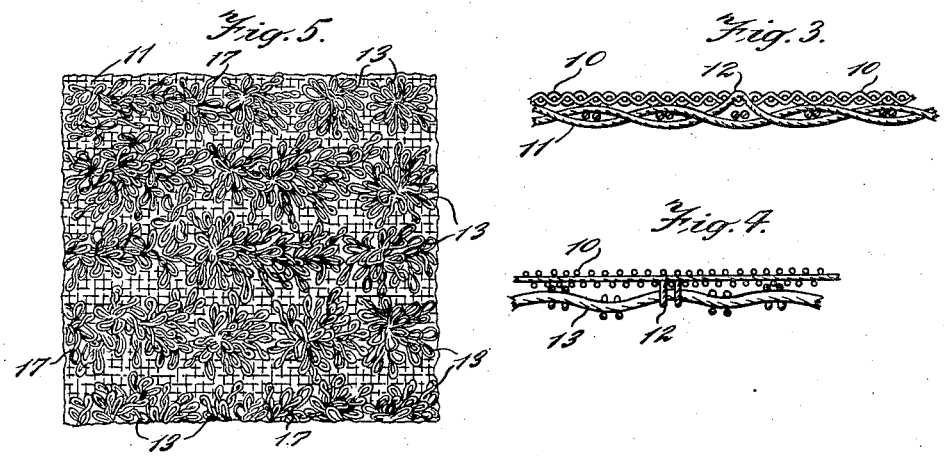
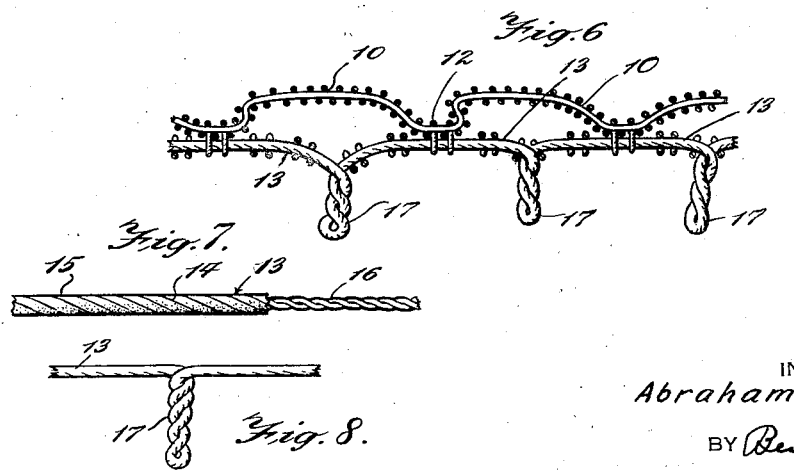
INVENTOR
Abraham A. Kahil
BY
ATTORNEY Patented June 11, 1946

2,401,828

UNITED STATES PATENT OFFICE 2,401,828

FABRIC

Abraham A. Kahil, Ridgefield, N. J.

Application July 18, 1944, Serial No. 545,470

9 Claims. (Cl. 28—74)

My invention relates to a woven fabric and a method of making the same in which the woven threads, or certain of them, have been held under torsional stress during weaving and thereafter released to cause these threads to curl or kink and thus shorten and thereby to cause the fabric to contract independently of a shrinking of the threads. The contracted fabric thus formed is elastic, stretching when subjected to tension sufficient to draw and straighten the kinked threads which will again contract and kink when the tension is released. After the woven threads have kinked and thus contracted their resistance to stretching may be increased by setting them more or less firmly in their kinked form or even setting them so firmly that they are substantially non-stretchable. For example certain artificial fibers, such as nylon, may be given a treatment such as a heat treatment or otherwise, which will give the threads a greater resistance toward stretching, or the threads might be cemented by a suitable solvent sufficient to set them permanently in their shortened condition.

The fabric may also contain other threads, either woven into the fabric as a part of the same ply, or interwoven as a separate ply or plies, or a separate ply or plies may be stitched or sewed to the contracted ply. In this way a number of different effects might be obtained. For example if certain types of threads are loosely woven into the same ply they may be contracted uniformly between the kinked threads giving a rough finish to one or both surfaces of the ply, particularly if the threads are loosely woven into the ply. Or a relatively tightly woven fabric may be interwoven with the elastic ply at suitably spaced intervals, either regularly or in random manner, before the torsionally stressed threads of the elastic ply are caused to kink. In this case as the threads of the elastic ply kink and shorten the more tightly woven ply interwoven therewith will pucker giving a crinkled or puckered surface ply. The interweaving of a second ply in this manner will not affect the elasticity of the fabric as a whole because the surface fabric may stretch to the limit of the length or breadth which it had prior to the kinking of the stressed threads.

A number of effects in the surface ply may be obtained by suitably selecting the manner of interweaving and the arrangement of the torsionally stressed threads. For example the closely woven surface ply might be regularly interwoven at spaced intervals with a base ply having the stressed threads in the warp only or in the weft only or in both warp and weft, or the surface ply might be interwoven with or sewed to the base ply at random intervals.

In weaving the ply to be shortened and rendered elastic the threads to be kinked are twisted beyond the normal twist so that they are under a torsional stress that would cause them to kink and contract unless under a tension sufficient to hold them straight. After being thus twisted and while held straight they are sized with a suitable material, such as glue, starch, etc., to resist the torsional stresses and are then woven into the ply while thus sized. After the fabric has been thus woven the size is washed out or dissolved out, whereupon the threads are free to kink at frequent intervals and thus shorten, drawing the ply to a smaller area. It is, of course, stretchable upon applying a tension sufficient to straighten the kinked threads but the resistance to this tension may be increased up to the point of rendering the fabric substantially non-stretchable under normal tensional forces.

The invention might be illustrated in a large variety of ways. The present invention, however, is illustrated in the accompanying drawing in which Fig. 1 is a face view of a two-ply fabric looking toward the surface ply which has been contracted in such a way as to cause puckering.

Fig. 2 is a view of the opposite side of the fabric prior to the removal of the size and contraction of the contracting ply.

Figs. 3 and 4 are sections, one at right angles to the other through the interwoven plies of the fabric prior to contracting.

Fig. 5 is a view taken from the reverse of Fig. 1.

Fig. 6 is a section on a larger scale of the contracted fabric.

Fig. 7 is a view on a large scale of a thread a portion of which has been twisted to subject it to torsional stresses and covered with a suitable size.

Fig. 8 shows the manner of twisting of the torsionally stressed thread upon removal of the size and of any tension or holding stresses.

In the embodiment of the invention shown in the accompanying drawing, the invention is illustrated as made up of an upper or face ply 10, Figs. 1 and 3, which is illustrated as a closely woven ply, and an underlying or loosely woven ply 11. As indicated at 12 in Figs. 2, 3 and 4, the two plies are interwoven at intervals by having a thread, either a warp or a weft thread as the case may be, pass from the lower ply 11 upwardly about a thread of the face ply and thence again into the lower or contracting ply. It will be understood that the two plies may be joined at intervals by other methods of interweaving or of tying the two plies together. As indicated in Figs. 3 and 4 the two plies are originally face to face and both are quite flat or smooth. This is the condition of the fabric when the plies have been woven and before removal of the size. After the removal of the size by washing or otherwise the threads of the torsionally stressed ply kink and contract as indicated in Figs. 6, 7 and 8 and form a backing ply, indicated in Fig. 5.

As shown in Figs. 7 and 8 a thread 13, such as may be used in the ply 11, may be tightly twisted as at 14 and then held in this tightly twisted position by a layer or impregnation of size 15 which cements the coils or twists of the thread to each other and thus holds them straight and without relative movement. This is sufficient to restrain and hold in check the torsional stress and to hold the threads straight. If at one end for a short space the sizing were removed, as at 16 in Fig. 7, the thread might merely untwist until the strands or fibers were out of torsion. However in a long piece of thread and particularly in a woven fabric this untwisting is not possible and the thread simply twists upon itself in small curls or kinks as indicated at 17 in Fig. 8.

The effect of this kinking is to contract the area of the contracting or underlying ply. If the stressed threads have been used only for the warp the contraction will take place longitudinally, and if used only for the weft it will take place transversely of the direction of weaving, and if the torsionally stressed threads be used both for warp and weft the contraction will take place in both directions and uniformly if the threads have been uniformly stressed. The result is indicated in Figs. 5 and 6 in which the threads 13 have been shortened by the kinking at 17 causing the upper or face ply 10 to pucker between the points 12. This gives the puckered or contoured design indicated in Fig. 1. On the reverse of the fabric kinks or twists 17 give the effect and appearance to the contracting or underlying ply 11 shown in Fig. 5.

It will be understood, of course, that if the front or facing fabric 10 is secured to the underlying or contracting ply 11 at short intervals the intermediate puckered areas will be much smaller and finer, and under certain conditions if the facing fabric be rather loosely woven these puckers may not be permanent and a cloth of a selected surface finish may be obtained but it will be stretchable with the stretching of the underlying or contracted ply as and when the latter is subjected to tension.

In case it is not desired that the contracted ply be stretchable but that it is desired to hold the fabric from stretching, the exposed surface of the ply 11 may be impregnated or coated by spraying with a suitable binder so as again to cement the twisted kinks 17 in such manner as to prevent them from untwisting under tension. In this way a non-extensible fabric or non-stretchable having a desired conformation of the face ply may be obtained.

Through the above invention, therefore, I have provided a method of making a fabric and a fabric which permits a face ply to be contracted by an underlying ply regardless of the type of material of which the plies are made and in which the fabric may thus be made either stretchable or non-stretchable either in one or both directions.

It will be understood that either ply may be made of any desired material as, for example, cotton, rayon, linen, nylon, wool, or a mixture of these materials, or of other natural or synthetic fibers, this is because the manner of forming the fabric and its construction rather than the materials of which it is made, serve to give it the desired composite structure.

What I claim is:

1. A method of making a composite fabric which comprises interweaving at spaced intervals a ply of threads which are substantially free from stress and a ply having loosely woven threads on which a torsional stress has been imposed sufficient to cause said threads to kink when said torsional stress is unopposed in which said torsional stress is resisted during said interweaving and said threads held straight by a size and removing said size after interweaving to permit said stressed threads to kink and shorten.

2. The method of claim 1 in which said ply of threads substantially free from stress is a closely woven fabric.

3. A method of making a composite fabric which comprises twisting threads to impose a torsional stress thereon, impregnating said threads with a size while under said torsional stress and while straight, weaving said sized threads into a fabric ply and interweaving said ply at intervals to a second ply and thereafter removing said size to permit said stressed threads to kink and to shorten the ply of which they are made.

4. A method of making a composite fabric which comprises weaving a ply of unstressed threads into a substantially closely woven ply, twisting threads to impose a torsional stress thereon, coating said threads with a size while straight and under torsional stress and weaving said twisted and sized threads into a second ply while securing said second ply to said first ply and thereafter removing said size to permit the torsionally stressed threads to kink and shorten and contract said composite fabric.

5. A composite fabric having a closely woven ply in which the warp and weft threads are substantially free from torsional stress and a second loosely woven ply interwoven at intervals with said first ply and in which the threads are sufficiently torsionally stressed to cause them to kink and shorten when not under tension and thereby to pucker said closely woven ply.

6. The fabric of claim 5 in which the kinks of kinked threads are cemented to hold them from unkinking and their ply from stretching.

7. A composite fabric having a loosely woven ply in which the threads are sufficiently stressed torsionally to cause them to kink when not under tension and to contract said ply, and at least one closely woven ply in which the threads are substantially free from torsional stress secured at spaced intervals to said first ply and of substantially the same area as said first ply when the threads of the latter are not kinked and puckered when said threads are kinked.

8. A composite fabric having a closely woven ply in which the warp and weft threads are substantially free from torsional stress, and a loosely woven ply secured at intervals to said first ply and having threads sufficiently torsionally stressed to cause them to kink and shorten when not under tension and thereby to pucker said closely woven ply.

9. A method of making a composite fabric which comprises twisting threads to impose a torsional stress thereon, loosely weaving said torsionally stressed threads while straight into a fabric ply, joining said ply at intervals to a second, closely woven, ply and thereafter permitting said torsionally stressed threads to kink and shorten the closely woven ply into which they have been woven.

ABRAHAM A. KAHIL.